United States Patent [19]

Pazienti et al.

[11] Patent Number: 5,164,990

[45] Date of Patent: Nov. 17, 1992

[54] METHOD AND APPARATUS FOR RECOGNIZING UNKNOWN SPOKEN WORDS AND BY FEATURE EXTRACTION AND COMPARISON WITH REFERENCE WORDS

[75] Inventors: Francesco Pazienti, Rome; Enzo Mumolo, Pomezia, both of Italy

[73] Assignee: Alcatel N.V., Netherlands

[21] Appl. No.: 527,384

[22] Filed: May 22, 1990

[30] Foreign Application Priority Data

May 22, 1989 [IT] Italy .............................. 20591 A/89

[51] Int. Cl.[5] .............................................. G10L 5/00
[52] U.S. Cl. ........................................ 381/43; 381/41
[58] Field of Search ................................. 381/41-43, 381/46-47; 364/513.5, 200

[56] References Cited

U.S. PATENT DOCUMENTS

| | | | |
|---|---|---|---|
| 4,348,853 | 9/1982 | Baker et al. | 364/513.5 |
| 4,426,551 | 1/1984 | Komatsu et al. | 381/41 |
| 4,488,243 | 12/1984 | Brown et al. | 364/513.5 |
| 4,751,737 | 6/1988 | Gerson et al. | 381/43 |
| 4,811,210 | 3/1989 | McAulay . | |
| 4,852,048 | 7/1989 | Morton | 364/200 |
| 4,882,756 | 11/1989 | Watari | 381/43 |
| 4,908,865 | 3/1990 | Doddington et al. | 381/43 |
| 4,918,733 | 4/1990 | Dougherty | 381/43 |
| 4,956,865 | 9/1990 | Lenning et al. | 381/43 |

OTHER PUBLICATIONS

IEEE Transaction on ASSP, vol. 36, No. 9, Sep. 1988. "A Digit Pipelined Dynamic Time Warp Processor" Mary Jane Irwin pp. 1412-1422.
"Simulation of a Highly Parallel System for Word Recognition", M. Yoder et al, ICASSP '85, Mar. 26-29, 1985, vol. 4, pp. 1449-1452.
"A Parallel Architecture for Speech Understanding:" E. C. Bronson et al, ICASSP, '81, Mar. 30-Apr. 1, 1981, vol. 3, pp. 1176-1179.
"Large Vocabulary Isolated Words Recognizer on a Cellular Array Processor", E. Mumolo et al, ICASSP '89, May 23-26, 1989, vol. 2 pp. 785-788.
"Storage Management in Virtual Tree Machines", F. W. Burton, IEEE Transactions on Computers, vol. 37, No. 3, Mar. 1988, pp. 321-328.
"A High Quality Digital Filterbank for Speech Recognition which Runs in Real Time on a Standard Microprocessor", H. F. Silverman, IEEE Transactions on Acoustics, Speech and Signal Processing, vol. ASSP-34, No. 5, Oct. 1986, pp. 1064-1073.

*Primary Examiner*—Robert L. Richardson
*Assistant Examiner*—Kee M. Tung
*Attorney, Agent, or Firm*—Ware, Fressola, Van Der Sluys & Adolphson

[57] ABSTRACT

Speech recognition is performed in several successive phases, with each word being separated into elements of equal length. Each element is represented by a vector consisting of eight coefficients. After the end of a word is recognized, the word is successively compared with all reference words in a speech recognition apparatus. The recognition process is speeded up through the utilization of common hardware for all phases and by avoidance of idle time. A cellular array processor is used whose processing elements operated predominantly as filters in the feature extraction phase, and each element compares two vectors in the comparison phase. By gradual transitions between ends and beginnings of words, the capacities of all processors are equally utilized. The exchange of data is practically limited to an exchange between adjacent processors and is thus very efficient.

16 Claims, 5 Drawing Sheets

Fig. 1

PRIOR ART

METHOD AND APPARATUS FOR RECOGNIZING UNKNOWN SPOKEN WORDS AND BY FEATURE EXTRACTION AND COMPARISON WITH REFERENCE WORDS

BACKGROUND OF THE INVENTION

1. Field of the Invention

The present invention relates to a method and an apparatus for feature extraction from an unknown spoken word and comparison with reference words.

2. Description of the Prior Art

In a widely used method, speech recognition takes place in several successive phases. Each spoken word to be recognized is separated into elements of equal length (e.g., 20 ms), "frames", and from each element the same characteristic features are extracted by a vector normally consisting of 8 coefficients. After word-end recognition, the word is successively compared with all reference words. Each of these comparisons is performed by a method commonly referred to as Dynamic Time Warping (DTW). In this method, a "distance" between the unknown word and each reference word is calculated, and the unknown word is equated to that reference word which is the shortest distance off. For further details, see S. B. Davis and P. Mermelstein, "Comparison of Parametric Representations for Monosyllabic Word Recognition in Continuously Spoken Sentences", IEEE Trans. Acoust., Speech, Signal Processing, Vol. ASSP-28, No. 4, August 1980, pp. 357-366, and H. Sakoe and S. Chiba, "Dynamic Programming Algorithm Optimization for Spoken Word Recognition", IEEE Trans. Acoust., Speech, Signal Processing, Vol. ASSP-26, February 1978, pp. 43-49. This method is very time-consuming, so that comparisons with only a few reference words are possible (small vocabulary). By the use of computers of higher capacity, the vocabulary can be enlarged, but if no additional steps are taken, the enlargement can only be proportional to the increased cost and complexity.

SUMMARY OF THE INVENTION

It is the object of the invention to provide a method and an apparatus in which a larger vocabulary can be processed through better utilization of the existing hardware.

This object is attained by a method using feature extraction comparison with reference words which comprises at least a feature extraction phase, in which the unknown word is separated into speech elements of equal length and in which a set of coefficients is assigned to each speech element, and a comparison phase in which the sets of coefficients are compared with a plurality of reference words each represented by a number of sets of coefficients. The feature extraction of a word and its comparison to reference words are performed under program control by the same computer arrangement, and different steps of the method are interleaved in time. Said method is implemented using a computer arrangement with a plurality of processors which can simultaneously process different data using the same program or instruction.

By using common hardware for all phases and by interleaving the steps of the method in time to avoid idle time, better use is made of the existing hardware.

The use of a Cellular Array Processor (CAP) whose processing elements operate predominantly as filters in the feature extraction phase and each compare one vector of the unknown word with one vector of a reference word in the comparison phase is particularly advantageous. By gradual transitions between ends and beginnings of words, the capacities of all processors are utilized equally and, thus, to the full even there. The exchange of data is practically limited to an exchange between adjacent processors and thus becomes very efficient.

Each of the measures described results by itself in an improved utilization of the existing hardware. Particular efficiency is achieved, however, if all measures described are applied together.

DESCRIPTION OF THE DRAWINGS

An embodiment of the invention will now be explained in detail with reference to the accompanying drawings, in which.

DETAILED DESCRIPTION OF THE PREFERRED EMBODIMENT

Figure 1:
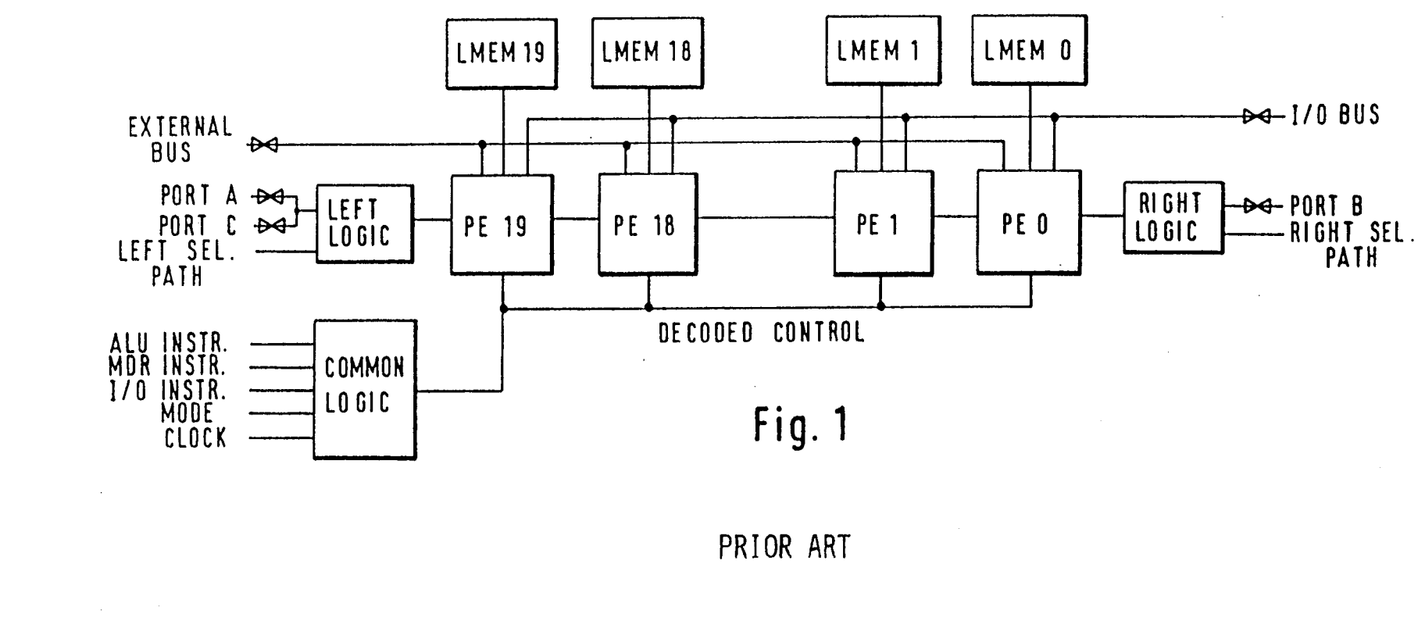
FIG. 1 is a functional block diagram of a Cellular Array Processor (CAP) as is used in an apparatus according to the invention.

The Cellular Array Processor (CAP) in FIG. 1 contains a Linear array of twenty 16-bit Processing Elements PE0, . . . , PE19, based on the Single Instruction Multiple Data (SIMD) architecture. Each PE can access 256 words of local memory (LMEM0, . . . , LMEM19, on a private bus. The processors can be programmed in pairs to form 32-bit processing elements. The internal structure of a PE supports arithmetic and logic operations and provides a set of 16 general-purpose registers.

Of the 20 PEs with associated local memories, only 16 are needed. The remainder, which may also be faulty, is switched off by software. In this manner, the yield is improved during manufacture.

A 32-bit EXTERNAL BUS is connected in parallel to the 20 PEs. With this application only 16 bits are used. Data transfers among internal processors and with the external world are done through this bus. A local bus, independent for each PE, allows a parallel access of the processors to the 256 words of individual memory. Shift paths between the neighbouring elements enable the data flow on the right or on the left through the array: three bidirectional ports, Port A, . . . Port C, are provided on the chip for communication of the leftmost and rightmost PEs with external devices. A third I/O BUS is provided to transfer data without interference with ALU and MEMORY activity: the I/O operations are asynchronous to the chip clock and can be controlled by external sources.

A COMMON LOGIC decodes three sets of pipelined control lines: ALU, MEMORY and I/O INSTRuctions.

Figure 2:
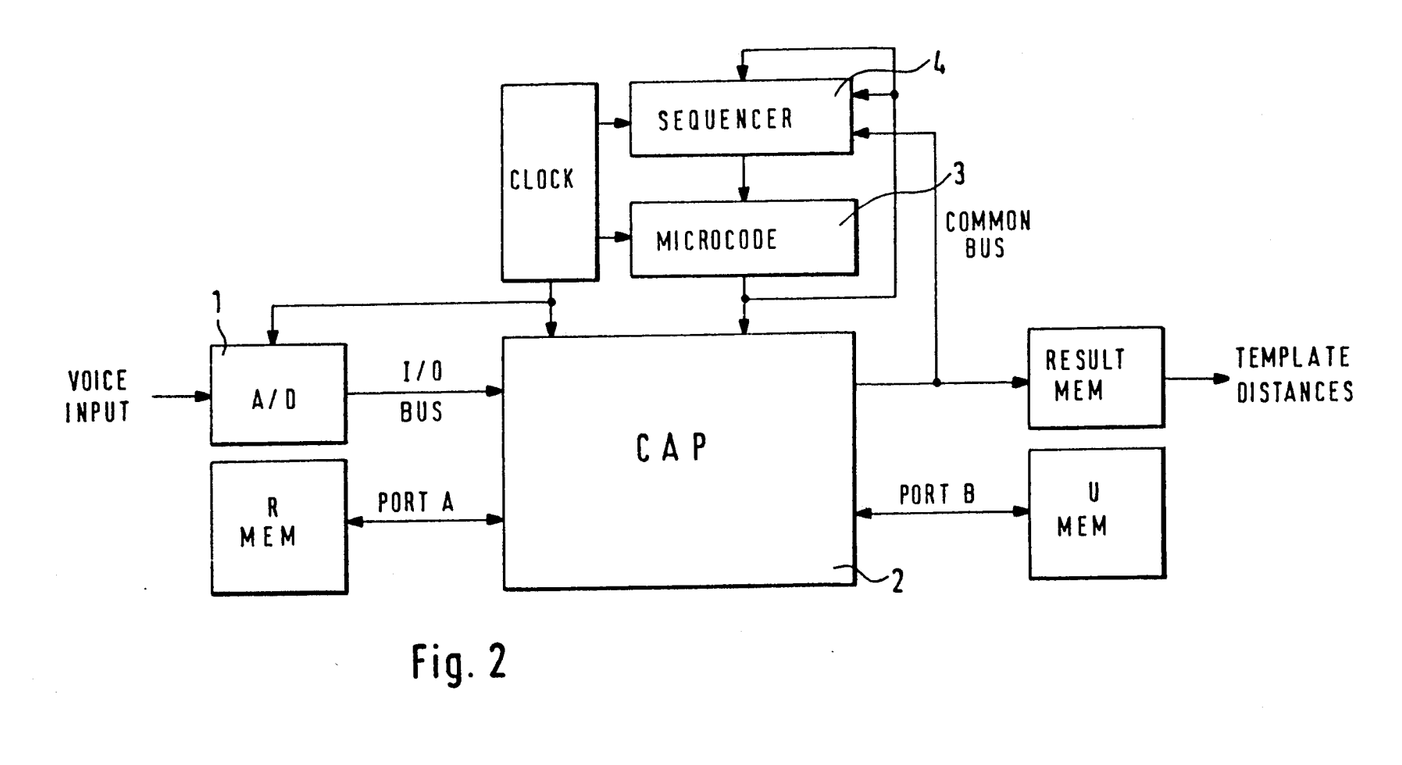
FIG. 2 is a block diagram of an apparatus according to the invention.

In the SIMD architecture a single instruction stream controls the full array, and the 16 processors execute the same operation on different local data. Nevertheless, a control mechanism is provided to enable or disable individual processors as a result of the local computation. This is a powerful support at microcode level for high level languages flow control structures. The functional diagram is depicted in FIG. 2.

The sampling logic 1 provides the array chip 2 with a new voice sample every 125 us by interrupt: the I/O BUS carries the data to the PE's in parallel.

Two blocks of external memory are connected to PORT A and PORT B, respectively, on the left/right shift bus for unknown and reference patterns. The U memory, U MEM, for the unknown word, is a high-speed ram with 2 Kbytes capacity, whereas the R memory, R MEM, for the reference words, provides 512 Kbytes of slow memory interfaced with a fast FIFO device for one cycle access time. The access to these memories is sequential. In the front-end phase the U memory is filled by the Ui vectors to be used in the recognition phase together with the Rj vectors of the R memory: an average word duration of 0.8 s means 40 frames and a total count of 320 bytes for each Rj. Therefore the R memory can hold a vocabulary of more than 1,500 words.

The connection to PORT A and PORT B allows external data to be loaded into the array and, at the same time, internal data to be moved between neighbouring PEs with a single shift instruction.

The control unit is formed by a program memory 3 and a sequencer device 4 for flow control. The program memory is 80 bits wide and 4 K deep. The use of a powerful sequencer device 4 enables the real time interrupt handling and unexpected procedure call.

A 2-Kbyte random access memory, RESULT MEM. connected to the EXTERNAL BUS of the array chip 2, holds the computation results: the cumulative distances can be read by an external processor for further analysis.

The method will be described as applied to the recognition of isolated words, but is not limited thereto.

The isolated word recognition includes different steps: endpoint detection, feature extraction and word comparison. The algorithms used to perform each of these steps will be briefly described.

A very simple algorithm is suitable for endpoint detection of isolated words. The algorithm is based on the energy profile of the input utterance computed frame by frame. Two amplitude thresholds are applied on the energy profile: one for deciding whether the current frame is a starting point of the word and one for deciding if it is an ending point. The algorithm works roughly as follows: at the beginning, if the frame energies are above the starting threshold for more than 100 ms, then a starting point is recognized; then, if from a given frame the energies remain below the ending threshold for more than 200 ms, the frame is decided to be an ending point.

A spectral representation of the input speech is used. Spectral informations are obtained with 14 band pass filters. Every 20 ms frame, an estimate of the energy in each filter bank frequency band is obtained by rectification and low pass filtering. The central frequencies of the filters are distributed on a MEL scale and have been designed assigning a constant Q. The spectral coefficients are log-converted and transformed to the cepstral domain. The logarithmic conversion is performed by using a log-like function which is a piecewise linear approximation of the log function.

Speech is thus represented with Mel-cepstral coefficients, computed with vector (14 log-energies Xk, k=1, . . , 14) by matrix (a 14×8 Mel-Cepstral transformation matrix) multiplication. Each frame is then represented by 8 coefficients, 1 byte each.

This form of feature extraction is generally known. For more details, see the above-mentioned article by S. B. Davis and P. Mermelstein.

These operations are carried out separately by 14 PE's (PE1, . . . , PE14). The Hamming window is applied by using a table look-up approach; the table (160 words wide) is contained in the local memory of each PE.

The 14 filters of the bank are of 6th order, Butterworth and are implemented by a cascade of 3 biquads; the filters coefficients are also contained in local memories locations (LMEM1, . . . , LMEM14).

In counting the PE's and local memories, unlike in FIG. 1, the four unused PEs and local memories were not included.

During this phase, two additional PE's, PE0 and PE15, with associated local memories are used for other tasks, such as formation of frames and word-end recognition.

The comparison between unknown words and reference words is carried out by using Dynamic Time Warping (DTW).

Let the reference and unknown words be called R and U. They are represented as a sequence of frames, each of them is a vector of 8 components (Mel-cepstral parameters):

$$U + U(1), \ldots, U(i), \ldots, U(N)$$

$$R = R(1), \ldots, R(j), \ldots, R(M)$$

The distance Dist (U, R) between the two words U and R is computed by eliminating the time differences between them.

Between the two frames U(i), R(j) a distance D(i,j) is defined; in our case the absolute value norm of the difference of the two vectors has been used. The goal of the time normalization process is to find a time warping path whose cumulative distance is a minimum; the minimum cumulative distance is then taken as the distance between the words.

Figure 3:
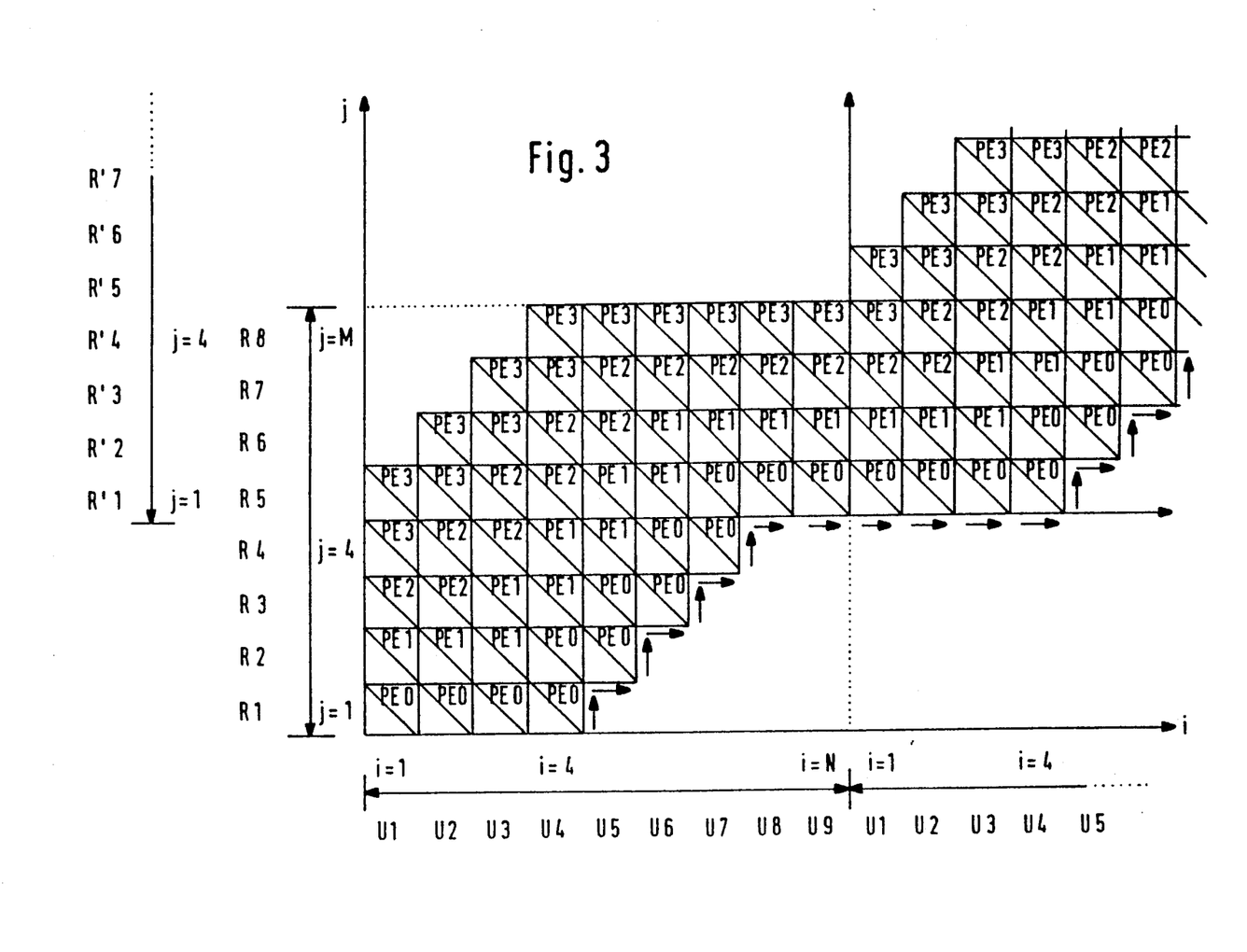
FIG. 3 shows schematically the operations performed in the apparatus of FIG. 1.
Figure 4:
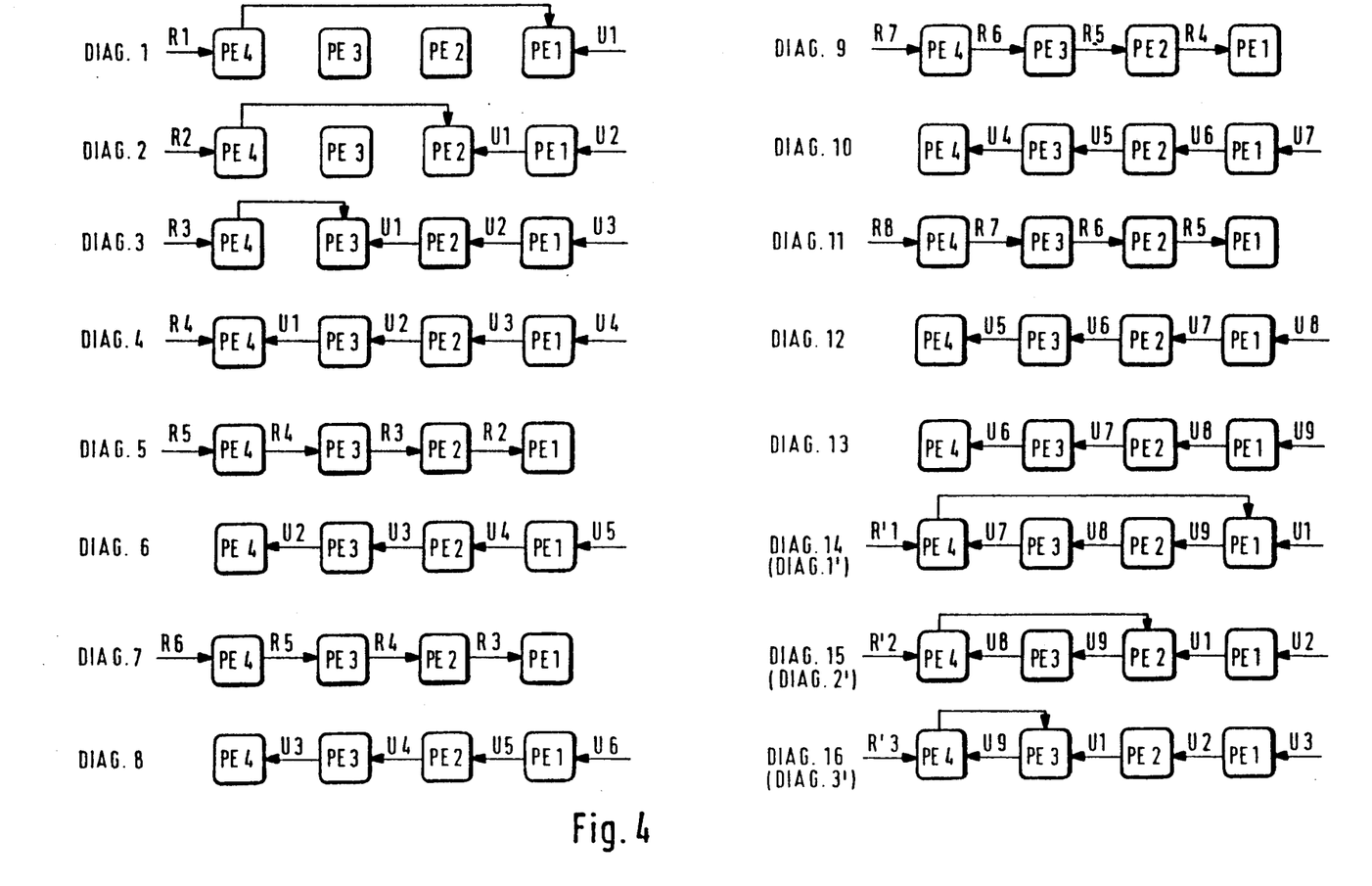
FIG. 4 shows the flow of the input data within the CAP.
Figure 5:
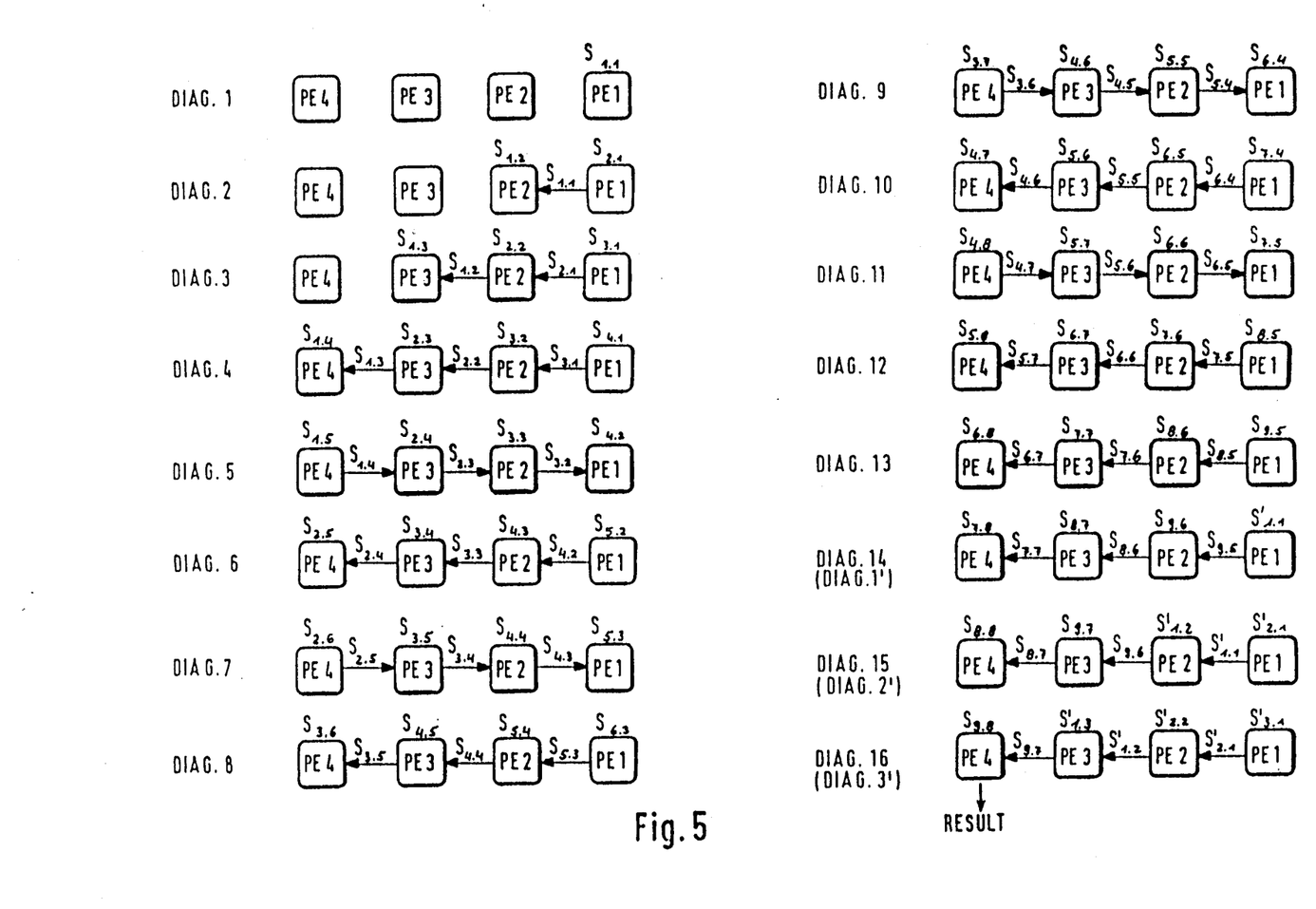
FIG. 5 shows the flow of the intermediate results within the CAP.

In DTW, the path is found very efficiently by dynamic programming, according to a local optimization recursion. The symmetric form of DTW may be used where the recursion is the following:

$$S(i,j) = \min \begin{array}{l} S(i-1, j-2) + 2\ D(i, j-1) + D(i,j) \\ S(i-1, j-1) + D(i,j) \\ S(i-2, j-1) + 2\ D(i-1, j) + D(i,j) \end{array}$$

where the S(i,j) are partial cumulative distances and the D(i,j) are local distances. In addition to the slope constraints imposed by this recursion and needed for avoiding unrealistic paths, the search area is also limited with an adjustment window. This window is explored by the array of processors on a diagonal basis as illustrated in FIG. 3. Further details, especially of the above-mentioned symmetric form of DTW and the adjustment window, are contained in the article by H. Sakoe and S. Chiba referred to above. The following FIGS. 3 to 5 show in simplified representations for only 4 PEs what is described in the text for 16 PEs.

The unknown and reference words comparison takes place in the (i,j) plane, FIG. 3, where each point represents the local distance between $U_i$, $i=1,\ldots,N$, and $R_j$, $j=1,\ldots,M$. Each PE of the linear array computes the local distance $D(i,j)$ and exchanges the computation results with its neighbours in order to evaluate the cumulative distance. The monotonic path allows a computation by subsequent diagonals, placed on points with indexes $i+j=$const. This implementation strategy restricts the search area to an adjustment window about the main diagonal $i=j$, with amplitude equal to the number of PEs in the array.

The minimization technique selected for the DTW algorithm enables the PE diagonal to move in the plane $(i,j)$ by alternative $i$ and $j$ increments, with the minimum search restricted to the values computed on the last two diagonals.

The program to be executed is different on diagonals (Dr) resulting from an increment of the i index (movement toward right) and on diagonals (Du) resulting from an increment of the j index (movement upward).

While FIG. 3 shows how the PEs process the adjustment window in the $(i,j)$ plane, FIGS. 4 and 5 show the associated data flow. FIG. 4 shows the exchange of the vectors $U_i$ and $R_j$, and FIG. 5 the exchange of the intermediate results, i.e., the partial cumulative distances $S(i,j)$. The PEs are linearly interconnected in such a manner that along this line they all can transfer data simultaneously to the right-hand PE or the left-hand PE. The data flow is thus very efficient.

At the beginning of the diagonal computation the new $U_i$ or $R_j$ vectors enter the array only through PE15 and PE0 via PORT A and PORT B, respectively. The internal PEs exchange the previous vectors by synchronous left-right shift on the neighbour bus.

The communication mechanism is also used to transfer between processors the result of the cumulative distance computation.

In this way, each PE contains, in its internal registers, the two vectors corresponding to its $(i,j)$ plane coordinates and the cumulative distances $S(i-1,j)$, $S(i,j-1)$, $S(i-1,j-1)$.

The slope constraint on the optimum path search is introduced by a flag: set to 0 ("free") it enables any path movement, set to 1 ("not free") only the diagonal direction can be chosen. The flag is the 14th bit of the cumulative distance word.

The current number of taken steps is memorized for each path in a word of the local memory.

The initial condition forces:

$$S(1,1)=2D(1,1)$$

$$S(i,1)=D(i,1)+S(i-1,1)$$

$$S(1,j)=D(1,j)+S(1,j-1)$$

The overall U and R comparison needs dtot diagonals Dr and Du, where $dtot=N+M-1$.

To optimize the array efficiency, the transition from a comparison to the next one is handled with a pipelined procedure: while the last PEs inside of the array still work on the previous R vectors, the first processors that become free start the distance computation between U and the new R' vectors. In FIGS. 4 and 5, this is indicated by the fact that the diagonals 14 to 16 are also designated as diagonals 1' to 3' (DIAG. 14=DIAG. 1', etc.).

FIGS. 3 to 5 show the algorithm development with $N=9$ and $M=8$ for a simplified array of 4 PEs: the transition phase (DIAG 14 to DIAG 16) is also presented.

The sequence of diagonals is different in each phase of the comparison and the switch to a new phase is decided by PE0, that for the flow control becomes master of the array. The preliminary condition that PE0 has to verify is $|N-M|$ less than 16, in order to guarantee that the final result will be inside of the computation window area. PE0 contains the N value of the unknown word and reads the M value as first word of each reference word. If the lengths N and M of the two words U and R differ too widely, no comparison of the vectors will be performed, but a distance D equal to a maximum value will be written into the result memory.

In the following the three phases of each comparison, a starting phase, a regime phase, and a final phase, are explained, with the assumption that N and M are equal to or greater than 16.

In the starting phase the 16 PEs enter the $(i,j)$ plane step by step, starting from PE0. The number of diagonals to be executed is always 16; on each diagonal DIAG1, . . . , DIAG16, the number K of involved processors is $K=d$ with d between 1 and 16. The PE(k) with k between 0 and 15 computes the local distance $D(i,j)$ where $$i=d-k$$

$$j=k+1$$

Actually in the first 16 diagonals of the starting phase the increment concerns only the i index, and only Dr diagonals will be performed. Each new PE($d-1$) participating in the comparison must execute an extra loading from the left memory of the R(d) vector.

In the regime phase the increments involve the j and i indexes, in alternate way, and a sequence of Du and Dr will take place: this phase ends when PE15 reaches the coordinate $j=M$.

The total number of diagonals dreg in the regime phase is:

| dreg = 0 | for M equal to 16 |
|---|---|
| dreg = 2(M − 16) − 1 | for M greater than 16 |

If du stores the current Du number, each PE(k) computes a $D(i,j)$ with indexes:

$$j=d-(du+k)$$

$$j=k+(du+1)$$

In the final phase the transition to a new comparison starts and only Dr diagonals will be executed: this phase ends when PE0 reaches the coordinate $i=N$. The number or diagonals dfin is:

| dfin + 0 | for N less than M |
|---|---|
| dfin = N − M + 1 | for N equal to or greater than M | and the $D(i,j)$ indexes:

$$i=d-(du+k)$$

$$j=k+(M-15)$$

At the end of this phase all the vectors required to the total distance computation are inside of the array: the final RESULT will be obtained with the pipelined procedure while PE0 enters the new starting phase for U and R' comparison.

When PE15, at the end of the total dtot diagonal number, reaches the final coordinates (N, M), the final phase is interrupted: the value of the normalized cumulative distance on the optimum path is written to the external result memory.

Except for the very last reference word, the final phase always coincides with the starting phase of the next word.

In the foregoing it was described in detail how the individual steps of the comparison phase are interleaved in time.

In the recognition phase, amplitude values are first collected, e.g., at a sampling rate of 8 KHz. At the end of a 20-ms frame, the coefficients representing this frame are then determined from these amplitude values. Thus, the capacity of the computer arrangement described, consisting of 16 PEs, is not fully utilized. The remaining time can be used to continue the comparison phase of the preceding word and, thus, to further enlarge the vocabulary. It could also be used to already perform first comparisons in the comparison phase of the word which is just beginning, but in that case the comparisons would have to be disintegrated and many intermediate results would have to be stored, because no comparison could be completed yet. For an isolated-word recognizer for, e.g., an inquiry system, the interleaving with the just beginning word is the only appropriate approach.

The term "word" is used here primarily in its colloquial sense, but the present invention is also readily applicable to other speech units, e.g. syllables, which can be compared with reference speech units in a manner analogous to that described above. Such speech units, too, are to be regarded as "words" as used herein.

What is claimed is:

1. Method of recognizing an unknown spoken word by feature extraction comparison with reference words which comprises at least a feature extraction phase, in which the unknown word is separated into speech elements of equal length and in which a set of coefficients is assigned to each speech element, and a comparison phase, in which the sets of coefficients are compared with a plurality of reference words each represented by a number of sets of coefficients, wherein the feature extraction of a word and its comparison with reference words are performed under program control by a common computer arrangement, and that different steps of the method are interleaved in time.

2. A method as claimed in claim 1, wherein the computer arrangement is a plurality of processors operating in parallel, that in the comparison phase all processors simultaneously compare one set of coefficients of the unknown word with one set of coefficients of a reference word step by step until the last set of coefficients of the unknown word has been compared with the last set of coefficients of the reference word, and that a transition from the comparison with one reference word to the comparison with the next reference word is such that the processors no longer needed for the comparison with said one reference word already begin the comparison with the next reference word.

3. A method as claimed in claim 2, wherein in the feature extraction phase, the computer arrangement simulates a filter bank, with each filter being simulated by one of the processors.

4. A method as claimed in claim 3, wherein others of the processors are used for the further task of formation of the speech elements in elements of equal length.

5. A method as claimed in claim 3, wherein others of the processors are used for the further task of word-end recognition.

6. A method as claimed in claim 1, wherein in processing pauses of the feature extraction phase, first comparisons of the comparison phase are already performed.

7. A method as claimed in claim 1, wherein in processing pauses of the feature extraction phase, a comparison phase of a preceding word is continued by further comparison.

8. Apparatus for feature extraction of an unknown spoken word and comparison with reference words, wherein it includes a computer arrangement with a plurality of processors which can simultaneously process different data with a common program.

9. An apparatus as claimed in claim 8, wherein the processors are linearly interconnected so that along this line they all can transfer data to a right-hand processor or data to a left-hand processor.

10. Method of recognizing an unknown spoken word by feature extraction comparison with reference words which comprises at least a feature extraction phase, in which the unknown word is separated into speech elements of equal length and in which a set of coefficients is assigned to each speech element, and a comparison phase, in which the sets of coefficients are compared with a plurality of reference words each represented by a number of sets of coefficients, wherein a computer arrangement for carrying out the method is a plurality of processors operating in parallel, in that in the comparison phase all processors simultaneously compare one set of coefficients of the unknown word with one set of coefficients of a reference word step by step until the last set of coefficients of the unknown word has been compared with the last set of coefficients of the reference word, and that the transition from the comparison with one reference word to the comparison with the next reference word is such that the processors no longer needed for the comparison with said one reference word already begin the comparison with the next reference word.

11. A method as claimed in claim 10, wherein in the feature extraction phase, the computer arrangement simulates a filter bank, with each filter being simulated by one of the processors.

12. A method as claimed in claim 11, wherein others of the processors are used for the further task of formation of the speech elements in elements of equal length.

13. A method as claimed in claim 10, wherein in processing pauses of the feature extraction phase, first comparisons of the comparison phase are already performed.

14. Method of recognizing an unknown spoken word by feature extraction comparison with reference words which comprises at least a feature extraction phase, in which the unknown word is separated into speech elements of equal length and in which a set of coefficients is assigned to each speech element, and a comparison phase, in which the sets of coefficients are compared with a plurality of reference words each represented by a number of sets of coefficients, wherein the feature extraction of a word and its comparison with reference words are performed under program control by a common computer arrangement, and that different steps of the method are interleaved in time wherein, in processing pauses of the feature extraction phase, first comparisons of the comparison phase are already performed.

15. Method of recognizing an unknown spoken word by feature extraction comparison with reference words which comprises at least a feature extraction phase, in which the unknown word is separated into speech elements of equal length and in which a set of coefficients is assigned to each speech element, and a comparison phase, in which the sets of coefficients are compared with a plurality of reference words each represented by a number of sets of coefficients, wherein the feature extraction of a word and its comparison with reference words are performed under program control by a common computer arrangement, and that different steps of the method are interleaved in time wherein, in processing pauses of the feature extraction phase, a comparison phase of a preceding word is continued by further comparison.

16. Method of recognizing an unknown spoken word by feature extraction comparison with reference words which comprises at least a feature extraction phase, in which the unknown word is separated into speech elements of equal length and in which a set of coefficients is assigned to each speech element, and a comparison phase, in which the sets of coefficients are compared with a plurality of reference words each represented by a number of sets of coefficients, wherein a computer arrangement for carrying out the method is a plurality of processors operating in parallel, in that in the comparison phase all processors simultaneously compare one set of coefficients of the unknown word with one set of coefficients of a reference word step by step until the last set of coefficients of the unknown word has been compared with the last set of coefficients of the reference word, and that the transition from the comparison with one reference word to the comparison with the next reference word is such that the processors no longer needed for the comparison with said one reference word already begin the comparison with the next reference word wherein, in processing pauses of the feature extraction phase, first comparisons of the comparison phase are already performed.

* * * * *

UNITED STATES PATENT AND TRADEMARK OFFICE
CERTIFICATE OF CORRECTION

PATENT NO. : 5,164,990

DATED : November 17, 1992

INVENTOR(S) : Pazienti et al

It is certified that error appears in the above-identified patent and that said Letters Patent is hereby corrected as shown below:

At column 7, line 63, prior to "already", please insert the word --word--.

Signed and Sealed this

Nineteenth Day of October, 1993

*Attest:*

BRUCE LEHMAN

*Attesting Officer*  Commissioner of Patents and Trademarks